though the machine shown in Fig. 1. Fig. 3 is a view in transverse section on line 3 3 of Fig. 2. Fig. 4 is a view in transverse section on line 4 4 of Fig. 2.

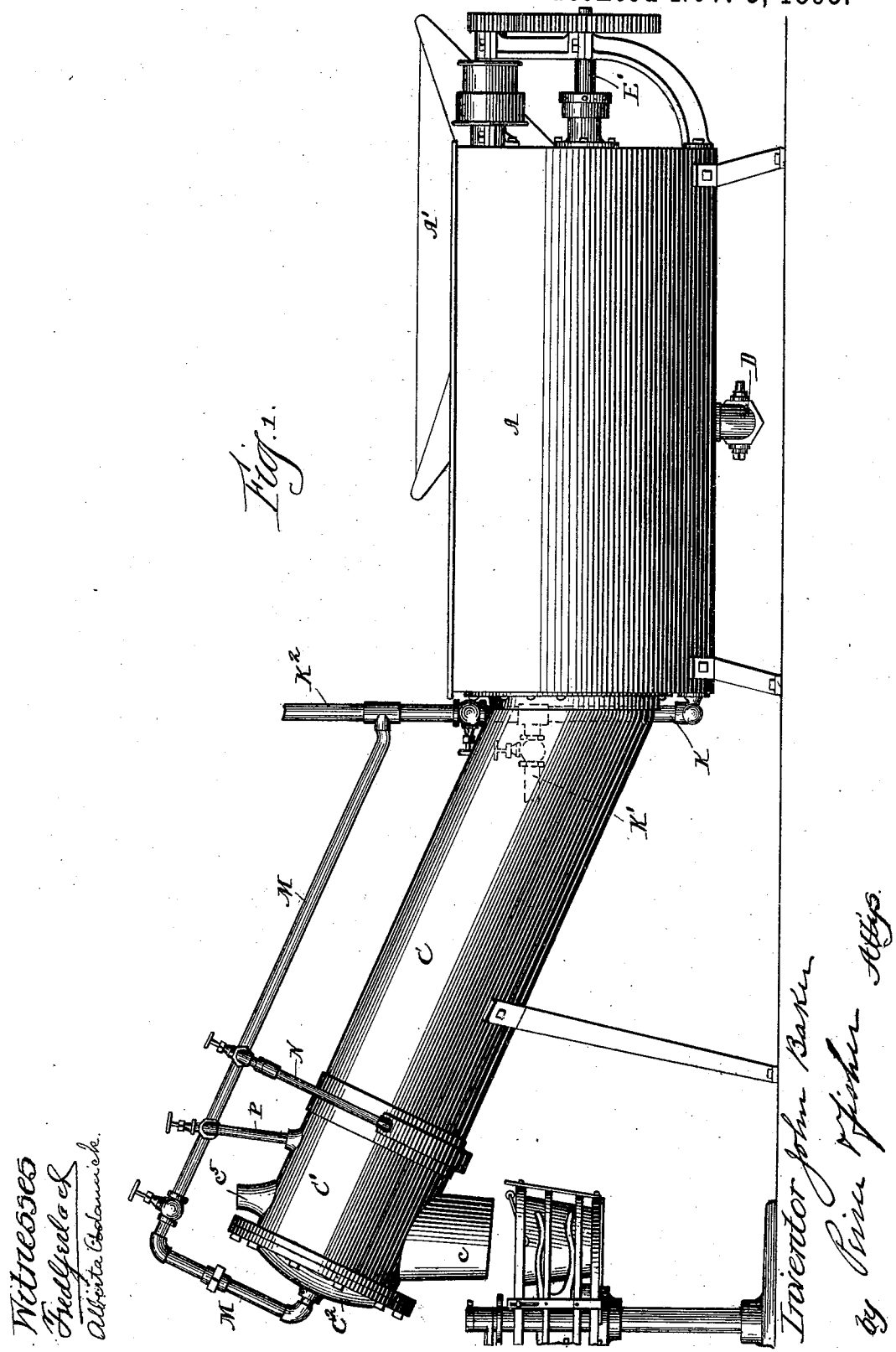

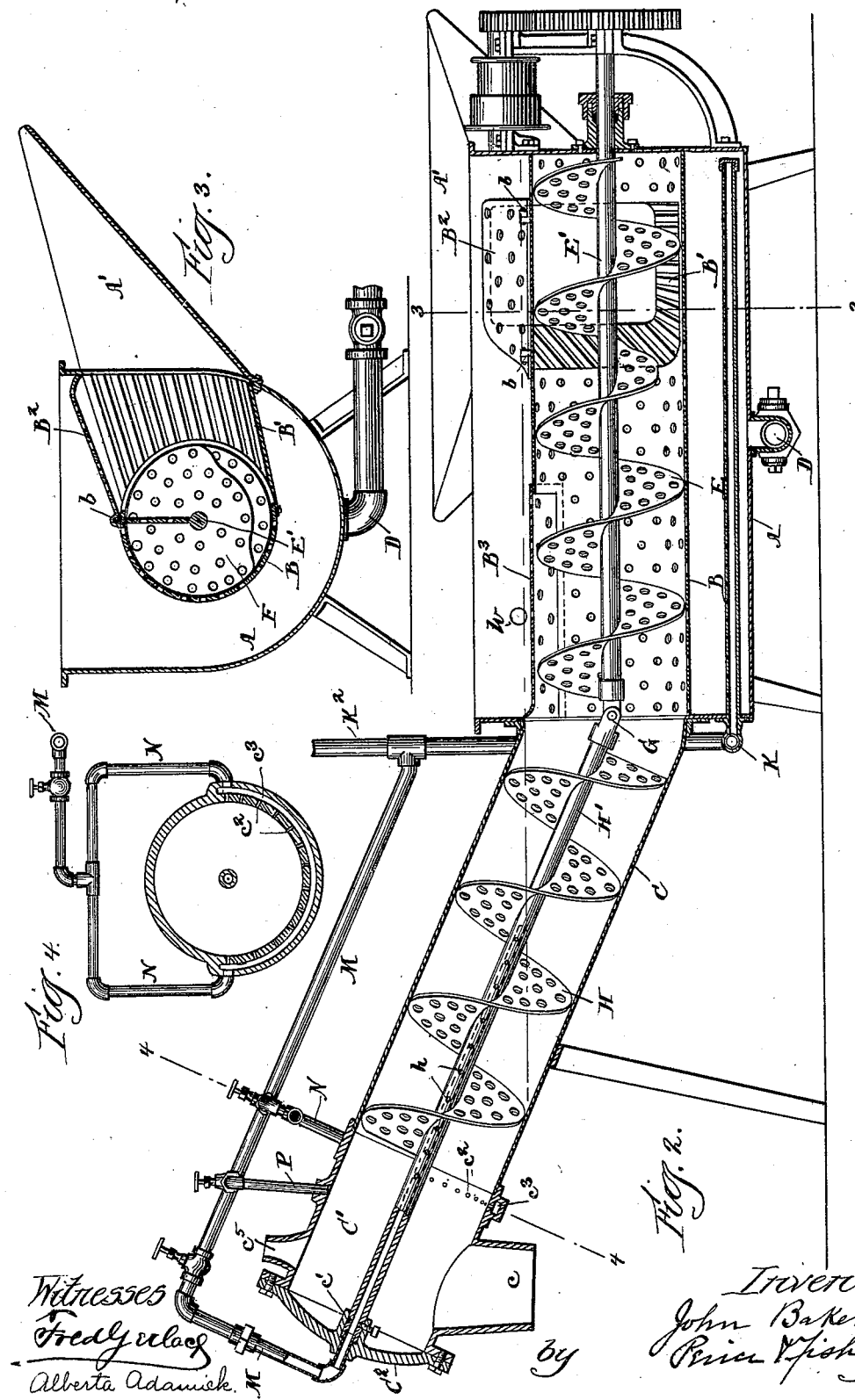

UNITED STATES PATENT OFFICE.

JOHN BAKER, OF MUSCATINE, IOWA.

MACHINE FOR CLEANING AND SCALDING TOMATOES.

SPECIFICATION forming part of Letters Patent No. 549,097, dated November 5, 1895.

Application filed May 3, 1895. Serial No. 547,996. (No model.)

*To all whom it may concern:*

Be it known that I, JOHN BAKER, a citizen of the United States, residing at Muscatine, Iowa, have invented certain new and useful Improvements in Machines for Cleaning and Scalding Tomatoes and the Like, of which I do declare the following to be a full, clear, and exact description, reference being had to the accompanying drawings, forming a part of this specification.

The present invention has for its object to provide an improved machine whereby tomatoes and other vegetables or fruits may be effectively cleaned and whereby the scalding of such vegetables or fruits may be effected, and this object I have accomplished by the improved apparatus hereinafter described, illustrated in the accompanying drawings, and particularly pointed out in the claims at the end of this specification.

Figure 1 is a perspective view of the machine embodying my invention. Fig. 2 is a view in central longitudinal vertical section through the machine shown in Fig. 1. Fig. 3 is a view in transverse section on line 3 3 of Fig. 2. Fig. 4 is a view in transverse section on line 4 4 of Fig. 2.

A designates a main water-tight tank, within which is mounted a perforated trough or screen B for holding tomatoes or like articles to be cleaned. In one side of the trough or screen B is formed a delivery-opening that is connected by a suitable chute B' with a delivery-hopper A', that leads from a delivery-opening formed in one side of the tank A. The delivery-chute B' is shown as formed of a series of slats, although a plate of perforated metal might be employed, and the top of the chute or spout is preferably provided with a cover B², that is hinged at b to the top of the perforated trough or screen B.

The trough or screen B, while preferably formed of perforated metal, might be formed of any other suitable perforated or foraminous material, the purpose of this trough or screen being to hold the tomatoes or like articles submerged in the water within the tank A during the cleaning operation and at the same time permit the dirt that is removed from them to fall through the trough or screen B to the bottom of the tank.

In one end of the tank A an opening is formed opposite the open end of the trough or screen B, and from such point extends an upwardly-inclined trunk C, the upper end C' of which is provided upon its under side with the discharge-spout c.

The bottom of the tank A is furnished with a suitable discharge-pipe D, whereby the water, dirt, and the like can from time to time be withdrawn from the tank.

The upper part of the trough or screen B may be furnished with a removable cover B³, extending over more or less of the top, the removal of this cover permitting ready access to the interior of the trough or screen.

Through the trough or screen B extends a conveyer worm or screw E, mounted upon a shaft E' that is journaled, as shown, in a suitable bearing at one end of the machine and at its opposite end is connected by a tumbling-joint G with the shaft H' of a similar conveyer screw or worm H, that extends along the inclined trunk C. The upper end of the shaft H is journaled in a suitable bearing c' of the cover C² of the trunk, this bearing c' being preferably formed as a hollow projection or boss on the inner face of the cover C². The outer end of the shaft E' of the worm E is provided with suitable gear mechanism, whereby the revolution of the worms E and H may be effected, and by preference the plates of which these worms are formed will be of perforated metal.

The tank A has connected thereto a supply-pipe K, whereby water and steam will be admitted to the tank, the water being delivered to the pipe K by a branch pipe K'. (Shown by dotted lines in Fig. 1.) It is manifest, however, that any suitable means may be employed for supplying the tank with water and steam. The upper portion of the shaft H' of the worm H is hollow and for a part of its length is provided with perforations $h$ to enable steam to be delivered into the trunk C, and with the hollow end of the shaft H' connects a steam-pipe M, that leads through perforations in the cover C². I provide the upper portion C' of the trunk C with a series of perforations $c^2$, through which steam will be admitted to the interior of the trunk, preferably from a channel $c^3$, that is formed integral with the adjacent part of the trunk, this channel $c^3$ receiving steam from suitable branch pipes N, that are connected with the steam-pipe M, this steam-pipe M being united with the main pipe K². By preference, also, a supplemental branch pipe P will extend from the pipe M through the top of the upper end C' of the trunk, in order to deliver a jet of steam downward onto the tomatoes or like articles before they are discharged from the trunk. I prefer, also, to provide the upper portion of the trunk C with a vent-opening $c^5$ for the escape of steam from the trunk. In the preferred form of my invention, the upper portion C' of the trunk is formed separately from the body of the trunk C the object of this construction being to permit this upper part of the trunk to be more readily formed with the various openings therein.

From the foregoing description it will be seen that if the tank A be supplied with water to slightly above the top of the trough or screen B the water will stand within the trunk C to a short distance below the perforations $c^2$. If, now, tomatoes or the like be delivered through the hopper A' and chute B' into the trough or screen B and the conveyer-screws E and H be operated so as to advance the tomatoes along the trough or screen B and up the incline C, the agitation of the tomatoes within the trough or screen B, while they are held submerged beneath the liquid in the tank, will loosen the dirt from them and the perforations or openings in the trough B will permit this dirt to fall to the bottom of the tank A, from which it may from time to time be withdrawn. This feature of mechanically agitating the tomatoes while contained within a submerged screen or perforated trough is an important one, because, while it insures the thorough cleaning of the tomatoes, it allows the dirt to drop from the receptacle wherein they are contained. After the tomatoes leave the trough B they will be carried up the incline trunk C by the conveyer-worm H, and as this worm moves them above the water-line they will be exposed to the action of dry steam admitted through perforations $c^2$ through the perforations $h$ in the shaft H' and through the branch pipe P, and will thereby be thoroughly scalded before their discharge through the spout $c$. It will be understood, of course, that suitable buckets or the like will be placed beneath the spout $c$, in order to receive the tomatoes as they are delivered therefrom. It will be seen, also, that not only will the tomatoes be thoroughly cleaned during their passage through the trough or screen B, but by the time they have been carried by the conveyer-worm H out of the water they are practically free from dirt or sand, and, consequently, when subjected to the action of the dry steam in order to loosen the skins, there is no danger of the dirt or sand getting into the body of the tomatoes, as is the case when the scalding is effected in the same bath in which the cleaning is done. I have shown the various steam-pipes as provided with suitable cocks, whereby the steam-supply can be controlled; but the operation of these is so obvious that it does not require further description.

In the preferred embodiment of my invention I provide that part of the pipe K that extends into the tank A with a series of perforations, so as to more uniformly distribute the steam or hot water throughout the tank. In some instances, or when treating certain classes of vegetables or fruits, it may be preferred to scald the same by hot water alone, and when this is the case the steam will be turned off and hot water only will be admitted into the tank A through the pipe K. It will be understood, of course, that the tank A may be provided with an overflow-port W, from which a suitable overflow-pipe will lead. The steam-pipe P at the upper end of the inclined chute C serves not only to aid in scalding the tomatoes or like articles, but I found, also, that it serves to force backward the scum and in great measure prevents it from passing through the discharge-spout $c$.

It is manifest that the precise details of construction above described may be varied without departing from the spirit of my invention and that features of the invention may be employed without its adoption as an entirety.

Having thus described my invention, what I claim as new, and desire to secure by Letters Patent, is—

1. In apparatus of the character described, the combination with a water-tight tank, of a perforated trough or screen suspended therein, a water-tight trunk connected at its lower end to said perforated trough or screen and leading upwardly therefrom to a point above the water discharge line of said tank, conveyer mechanism for advancing the material through said trough or screen and through said trunk and means for injecting steam into the upper end of said trunk above the water line, substantially as described.

2. In apparatus of the character described, the combination with a water-tight tank, of a perforated trough or screen suspended therein, a conveyer worm for agitating and for advancing the articles to be cleaned through said perforated trough or screen, whereby sand or the like is removed from said articles before they are discharged from said trough or screen, drive mechanism at the front end of said conveyer worm, a water-tight trunk connected to said trough or screen above the bottom of said tank and leading to a point above the water discharge line of said tank, a conveyer worm within said trunk, a journal bearing at the upper end of said trunk for the shaft of said worm and a tumbling joint connection at the lower end of said worm and uniting said worm with the conveyer worm in said trough or screen, substantially as described.

3. In apparatus of the character described, the combination with a water-tight tank, of a perforated trough or screen suspended in said tank, suitable conveyer mechanism for advancing the articles to be cleaned through said perforated trough or screen and a water-tight trunk connected at its lower end to said perforated trough or screen and leading upwardly therefrom, the upper part of said trunk being provided with the channel $c^3$ having a series of perforations $c^2$ above the water line and adjacent to the discharge opening at the upper end of the trunk, substantially as described.

4. In apparatus of the character described, the combination with a water-tight tank, of a perforated trough or screen suspended therein, a water-tight trunk connected with said trough or screen, said trunk having its upper end provided with a discharge opening and with openings for the admission of steam and being formed separate from the body of the trunk, and suitable conveyer mechanism for advancing the articles to be cleaned and scalded through said trough or screen and through said trunk, substantially as described.

JOHN BAKER.

Witnesses:
GEO. P. FISHER, Jr.,
ALBERTA ADAMICK.